United States Patent
Yamamoto

(10) Patent No.: US 11,661,037 B2
(45) Date of Patent: May 30, 2023

(54) VEHICLE FRONT STRUCTURE

(71) Applicant: Toyota Jidosha Kabushiki Kaisha, Toyota (JP)

(72) Inventor: Shunsuke Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 225 days.

(21) Appl. No.: 17/083,504

(22) Filed: Oct. 29, 2020

(65) Prior Publication Data

US 2021/0146887 A1 May 20, 2021

(30) Foreign Application Priority Data

Nov. 15, 2019 (JP) .............................. JP2019-207248

(51) Int. Cl.
*B60S 1/46* (2006.01)
*B60R 13/10* (2006.01)

(52) U.S. Cl.
CPC .............. *B60S 1/46* (2013.01); *B60R 13/105* (2013.01)

(58) Field of Classification Search
CPC .. B60S 1/0848; B60S 1/02; B60S 1/04; B60S 1/00; B60S 3/008; B60S 3/002; B60S 1/56; B60Q 1/0023; B08B 3/02; B08B 2203/027; B60R 13/105; B60R 19/483

USPC ....................................................... 348/148
See application file for complete search history.

(56) References Cited

U.S. PATENT DOCUMENTS

| | | | |
|---|---|---|---|
| 11,305,742 B2* | 4/2022 | Singh | B60S 1/528 |
| 2007/0150196 A1* | 6/2007 | Grimm | B60T 7/22 |
| | | | 348/148 |
| 2018/0229679 A1 | 8/2018 | Yasui | |
| 2020/0353862 A1* | 11/2020 | Schaye | B60Q 1/2603 |
| 2021/0009086 A1* | 1/2021 | Horibe | G02B 27/0006 |
| 2022/0144219 A1* | 5/2022 | D'Onofrio | B60S 1/52 |

FOREIGN PATENT DOCUMENTS

| | | |
|---|---|---|
| JP | 2018-131044 A | 8/2018 |
| JP | 2019-104365 A | 6/2019 |

* cited by examiner

*Primary Examiner* — Nathnael Aynalem
(74) *Attorney, Agent, or Firm* — Dinsmore & Shohl LLP

(57) ABSTRACT

A vehicle front structure which includes a bracket and a washer. The bracket is disposed between a part of a back surface of a license plate and a front grille. The bracket fastens the license plate to the front grille. The washer moves forward on the back side of the license plate in an area without the bracket in order to clean a sensing surface of a sensor which monitors the front of the vehicle. The bracket includes one or more of supporting portions which protrude on the washer side and support the license plate from the back side of the license plate.

14 Claims, 5 Drawing Sheets

VEHICLE FRONT STRUCTURE

CROSS REFERENCE TO RELATED APPLICATION

This application claims priority to Japanese Patent Application No. 2019-207248 filed on Nov. 15, 2019, which is incorporated herein by reference in its entirety including the specification, claims, drawings, and abstract.

TECHNICAL FIELD

The present disclosure relates to a vehicle front structure, in particular, to a vehicle front structure including a washer which is disposed on the back side of a license plate to clean a sensor which monitors the front of a vehicle.

BACKGROUND

A vehicle includes various sensors to assist driving or perform autonomous driving of the vehicle. Some sensors which monitor the front of a vehicle are disposed near a license plate. Because the sensing performance of these sensors may be lowered due to dirt or other contamination built up on a sensing surface (also called "sensor surface") of the sensor, the sensing surface is cleaned with a washer which jets cleaning liquid or other material. The washer is disposed near the sensing surface; for example, on the back side of the license plate.

JP 2018-131044A discloses a vehicle front structure in which a sensing surface (light emitting surface or light receiving surface) of a laser for measuring a distance between the vehicle itself and the vehicle in front for autonomous driving is disposed below a license plate.

SUMMARY

Some vehicles include a washer which is movable along a longitudinal axis of the vehicle on the back side of a license plate. This washer moves forward to clean the sensing surface of a sensor which monitors the front of the vehicle. In such vehicles, the forward movement of the washer may be blocked when the license plate is bent rearward due to driving wind or other factors.

An object of the present disclosure is to prevent rearward bending of a license plate which would block a forward movement of a washer disposed on the back side of the license plate.

A vehicle front structure according to an embodiment of the present disclosure includes a bracket which is disposed between a part of a back surface of a license plate and a front grille. The bracket fastens the license plate to the front grille. The vehicle front structure also includes a washer which is configured to move forward on the back side of the license plate in an area without the bracket in order to clean a sensing surface of a sensor which monitors the front of a vehicle. The bracket includes one or more supporting portions which protrude on the washer side and support the license plate from the back side of the license plate.

In a vehicle front structure according to the embodiment of the present disclosure, the supporting portions of the bracket may be disposed on respective sides of the washer to thereby sandwich the washer.

In a vehicle front structure according to the embodiment of the present disclosure, the sensor may be a LiDAR which is configured to sense an object in front of the vehicle.

In a vehicle front structure according to the present disclosure, the washer may be disposed below a body of the bracket in order to clean the sensing surface which is disposed below the license plate.

In a vehicle front structure according to another embodiment of the present disclosure, the washer may be disposed above a body of the bracket in order to clean the sensing surface which is disposed above the license plate.

In a vehicle front structure according to yet another embodiment of the present disclosure, the washer may be disposed on the vehicle right (as used herein, "vehicle right" refers to the right side when viewed from the rear of the vehicle) of a body of the bracket in order to clean the sensing surface which is disposed on the vehicle right of the license plate.

In a vehicle front structure according to yet another embodiment of the present disclosure, the washer may be disposed on the vehicle left (the left side when viewed from the rear of the vehicle) of a body of the bracket in order to clean the sensing surface which is disposed on the vehicle left of the license plate.

According to the present disclosure, because the supporting portions of the bracket protrude on the washer side to support the license plate from the back side thereof, rearward bending of the license plate where the washer is disposed can be prevented. Because space can be maintained between the license plate and the washer, the forward movement of the washer can be reliably performed.

BRIEF DESCRIPTION OF DRAWINGS

Embodiments of the present disclosure will be described based on the following figures, wherein.

DESCRIPTION OF EMBODIMENTS

Figure 1:
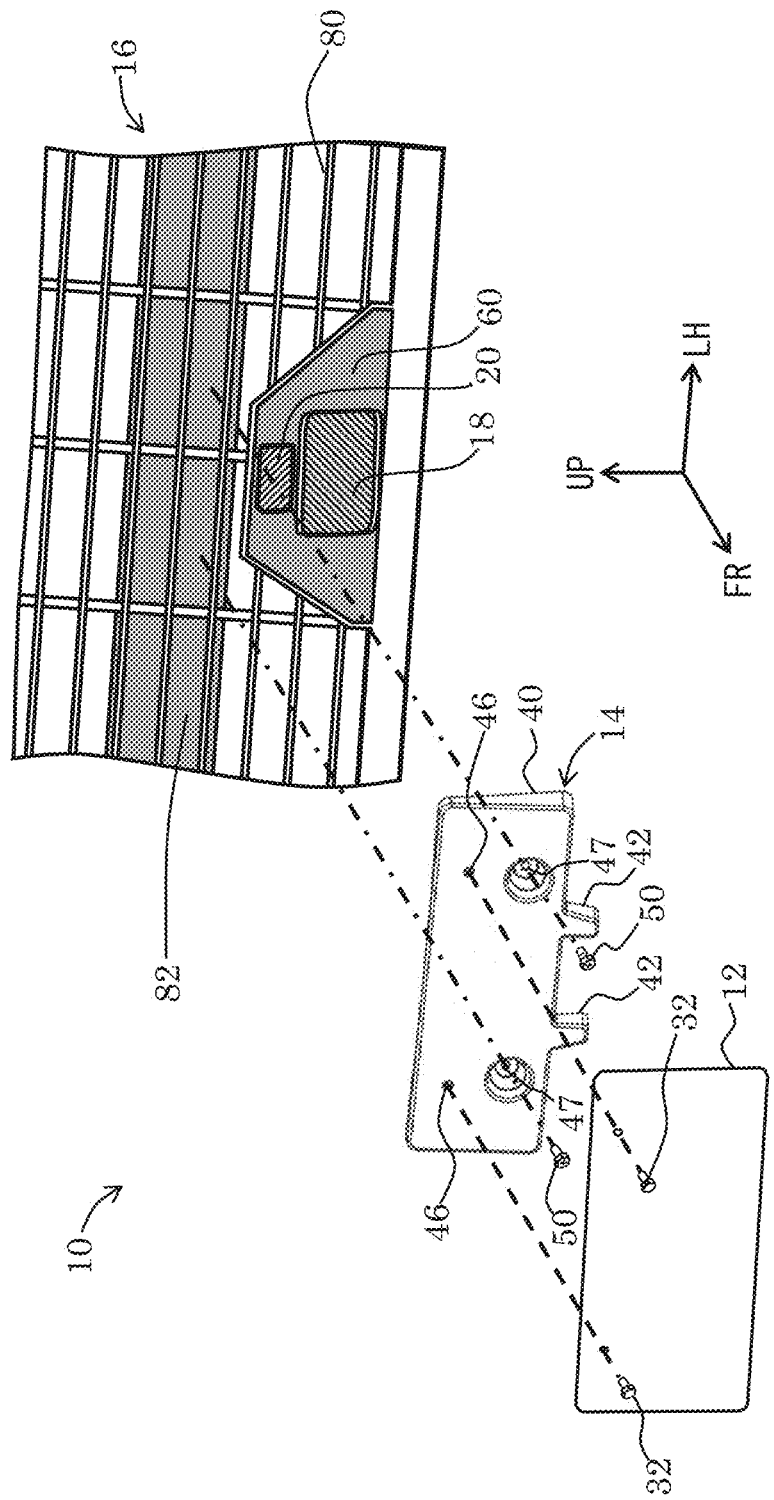
FIG. 1 is an exploded perspective view of a front portion of a vehicle on which a license plate is to be mounted, according to an embodiment of the present disclosure.

Embodiments of the present disclosure are described below with reference to the attached drawings. The configurations described below are merely examples to describe the present disclosure and may be changed according to specifications or other requirements of a vehicle. Throughout the drawings, the same reference numerals are assigned to similar elements, and redundant description is omitted. Throughout the drawings, FR, UP, and LH respectively indicate the front, up, and left of the vehicle. In description below, "vehicle right" and "vehicle left" respectively refer to the right side and the left side when viewed from the rear of the vehicle.

Figure 2:
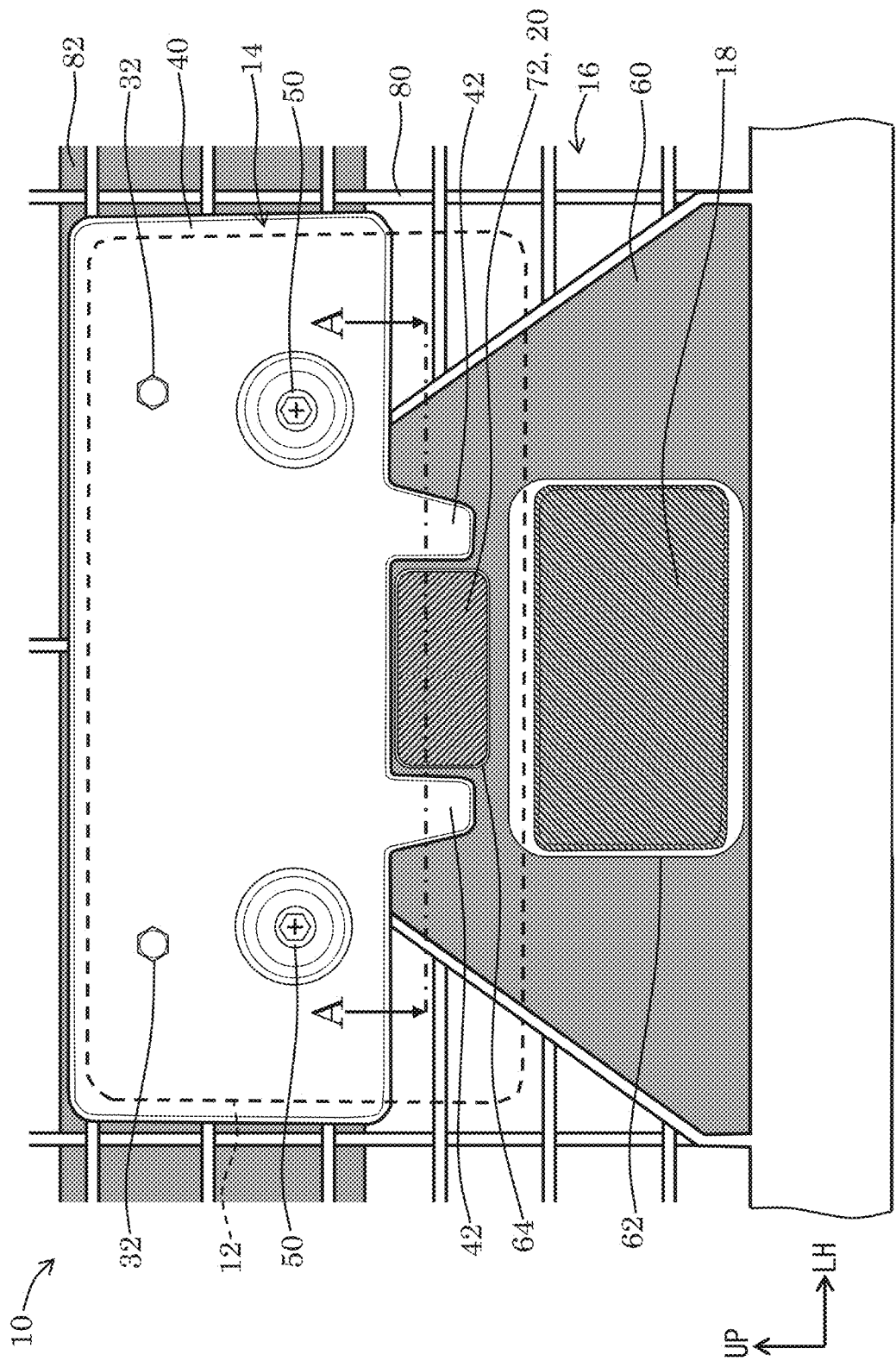
FIG. 2 is a front view of the front portion of the vehicle on which the license plate is to be mounted.

FIG. 1 is an exploded perspective view of a front portion of a vehicle on which a license plate 12 is to be mounted, according to an embodiment of the present disclosure; and FIG. 2 is a front view of the front portion of the vehicle on which the license plate is to be mounted, according to the embodiment of the present disclosure. The vehicle includes, below the license plate 12, a sensing surface (also called "sensor surface") 18 of a laser imaging, detection and ranging device (LiDAR) which senses an object in front of the vehicle. The sensing surface 18 of the LiDAR emits laser light and receives reflected light from an object. The vehicle is configured to assist driving or perform autonomous driving using information sensed by the LiDAR.

As shown in FIG. 1, a vehicle front structure 10 according to an embodiment of the present disclosure includes the license plate 12, a front grille 16, and a license plate bracket 14 (also referred to simply as "bracket 14" below) which is disposed between a part of the back surface of the license plate 12 and the front grille 16 to fasten the license plate 12 to the front grille 16. FIGS. 1 and 2 show a part of the front grille 16. In Japan, license plates are also called "number plates". The vehicle front structure 10 also includes a LiDAR washer 20 (also referred to simply as "washer 20" or "cleaning device 20") which moves forward on the back side of the license plate 12 in an area without the bracket 14 to clean a sensing surface 18 of the LiDAR.

The front grille 16 includes a mesh-type grille portion 80, a supporting beam member 82 which extends along a transverse axis of the vehicle on the back side of the grill portion 80 and is united with the grille portion 80, and a substantially trapezoidal front plate 60 which is centered along the transverse axis of the vehicle at a lower portion. As shown in FIG. 2, the front plate 60 of the front grille 16 includes two windows 62, 64, one above the other. The sensing surface 18 of the LiDAR is located behind the lower window 62, whereas the washer 20 is located behind the upper window 64. The sensing surface 18 of the LiDAR and the front surface of the front plate 60 of the front grille 16 are substantially at the same position along the longitudinal axis of the vehicle.

The washer 20 which includes a cover 72 at the front is movable along the longitudinal axis of the vehicle. When not washing the sensing surface 18, the washer 20 is retracted rearward such that the front surface of the cover 72 of the washer 20 is in the same plane as the front surface of the front plate 60 of the front grille 16 (refer to FIG. 3A). As the front plate 60 and the cover 72 form a flat front surface together even without the license plate 12 and the bracket 14, the vehicle can maintain a smooth appearance at the front. The reason for maintaining the smooth appearance of the front of the vehicle without the license plate 12 and the bracket 14 is that the license plate 12 and the bracket 14 may not be attached at the same positions as in the present embodiment (vehicle transverse center at a lower portion) in some countries or regions where the vehicle travels. In order to wash the sensing surface 18 of the LiDAR, the washer 20 moves (pops) forward to jet cleaning liquid to the sensing surface 18 (refer to FIG. 3B).

As shown in FIG. 1, the bracket 14 includes a bracket body 40 (also referred to simply as "body 40" below) which has a rectangular shape whose longer edges extend along the transverse axis of the vehicle in the vehicle front view, and two supporting portions 42 which protrude on the washer 20 side (downward) and support the license plate 12 from the back side thereof. While, as shown in FIG. 2, the two supporting portions 42 of the bracket 14 protrude on the washer 20 side (downward), the two supporting portions 42 do not overlap with the cover of the washer 20 in the vehicle front view. The above description "two supporting portions 42 which protrude on the washer 20 side" indicates that while the supporting portions 42 of the bracket 14 protrude on the washer 20 side with respect to the body 40 of the bracket 14, the supporting portions 42 do not overlap with the washer 20 in the vehicle front view. The body 40 and the supporting portions 42 of the bracket 14 surround a part of the outer edges of the cover 72 of the washer 20. As shown in FIG. 1, the bracket 14 has a certain thickness along the longitudinal direction of the vehicle with the outer edges of the body 40 and the supporting portions 42 protruding rearward. The bracket body 40 includes two through holes 47 for fastening the bracket 14 to the front grille 16 and another two holes 46 for attaching the license plate 12 to the bracket 14. The two through holes 47 are provided inside two recessed portions which are provided apart from each other along the transverse axis of the vehicle at lower positions of the bracket body 40, whereas the two holes 46 are located away from each other along the transverse axis of the vehicle at upper positions.

The bracket 14 is fastened to the front grille 16 with two screws 50 which are inserted into the two through holes 47 of the bracket body 40 from the vehicle front side and secured in the supporting beam member 82 of the front grille 16. The license plate 12 is attached to the bracket 14 with two bolts 32 which are inserted from the vehicle front side into two through holes of the license plate 12 and threaded into the two holes 46 of the bracket body 40. The license plate 12 is secured to the front grille 16 via the bracket 14.

As shown in FIG. 2, the washer 20 is disposed on the back side of the license plate 12 and the sensing surface 18 of the LiDAR is disposed below the license plate 12. The washer 20 is movable along the longitudinal axis of the vehicle in an area below the bracket body 40 and between the supporting portions 42 without the bracket in the front view of the vehicle.

Figure 3A:
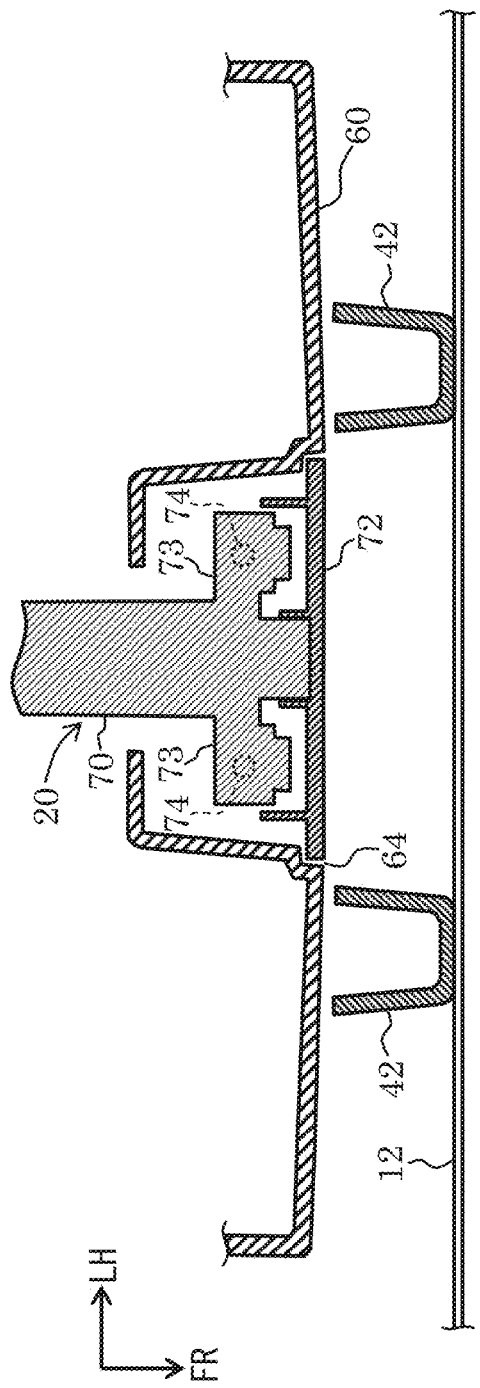
FIG. 3A is a cross-sectional view taken along line A-A in FIG. 2, showing a washer at a position when the washer does not clean a sensing surface.
Figure 3B:
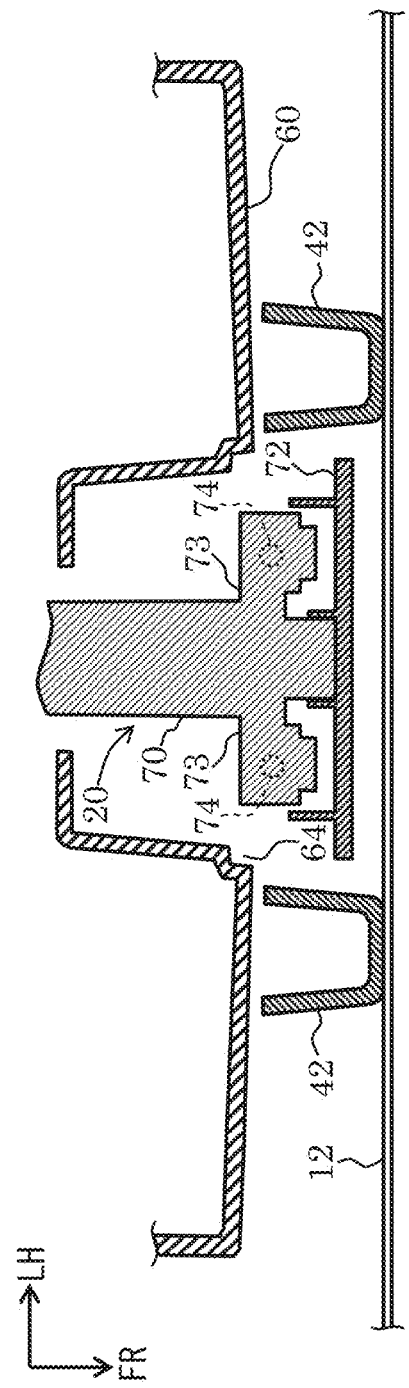
FIG. 3B is a cross-sectional view taken along line A-A in FIG. 2, showing the washer at a position when the washer cleans the sensing surface.

FIG. 3A shows the washer 20 at a position in the cross section taken along line A-A in FIG. 2 when the washer 20 is not cleaning the sensing surface, whereas FIG. 3B shows the washer 20 at a position in the cross section taken along line A-A in FIG. 2 when the washer 20 is cleaning the sensing surface. The washer 20 includes a movable portion 70 which is movable along the longitudinal axis of the vehicle, two cleaning liquid jet portions 73 disposed on the respective sides of the movable portion 70 at the front, and the cover 72 fixed at the center portion of the movable portion 70 on the front end side. Each cleaning liquid jet portion 73 includes, at the bottom, a nozzle 74 which jets the cleaning liquid. As shown in FIG. 3A, because the supporting portions 42 have a certain thickness along the longitudinal axis of the vehicle, sufficient space is provided between the license plate 12 and the washer before the activation.

As shown in FIG. 3A, the washer 20 is at a rear retracted position when not cleaning the sensing surface of the LiDAR. In contrast, as shown in FIG. 3B, during cleaning of the sensing surface of the LiDAR, the movable portion 70 of the washer 20 advances such that the two cleaning liquid jet portions 73 of the washer 20 are moved forward from the front grille between the two supporting portions 42 to a position where the two nozzles 74 are placed at a position along the longitudinal axis of the vehicle to be able to jet the cleaning liquid to the sensing surface of the LiDAR. At the position shown in FIG. 3B, the cleaning liquid jet portions 73 of the washer 20 jet the cleaning liquid downward from the nozzles 74. In this way, dirt, mud, and so forth accumulated on the sensing surface of the LiDAR are cleaned with the cleaning liquid, thereby preventing degradation of the sensing performance of the LiDAR due to the accumulation of dirt and so forth. When the cleaning of the sensing surface finishes, the movable portion 70 of the washer 20 is retracted such that the washer 20 returns to a position shown in FIG. 3A.

According to the vehicle front structure 10 of the embodiment of the present disclosure described above, the supporting portions 42 of the bracket 14 are disposed on respective sides of the washer 20 to sandwich the washer 20 to support the license plate 12 from the back side thereof. In this way, at the position where the washer 20 is disposed, the license plate 12 is prevented from deforming (bending) toward a moving area of the washer 20 due to driving wind or other factors, and sufficient space (to allow the washer 20 to operate) between the license plate 12 and the washer 20 can be maintained. As a result, the license plate 12 does not block the forward movement of the washer 20.

Figure 4:
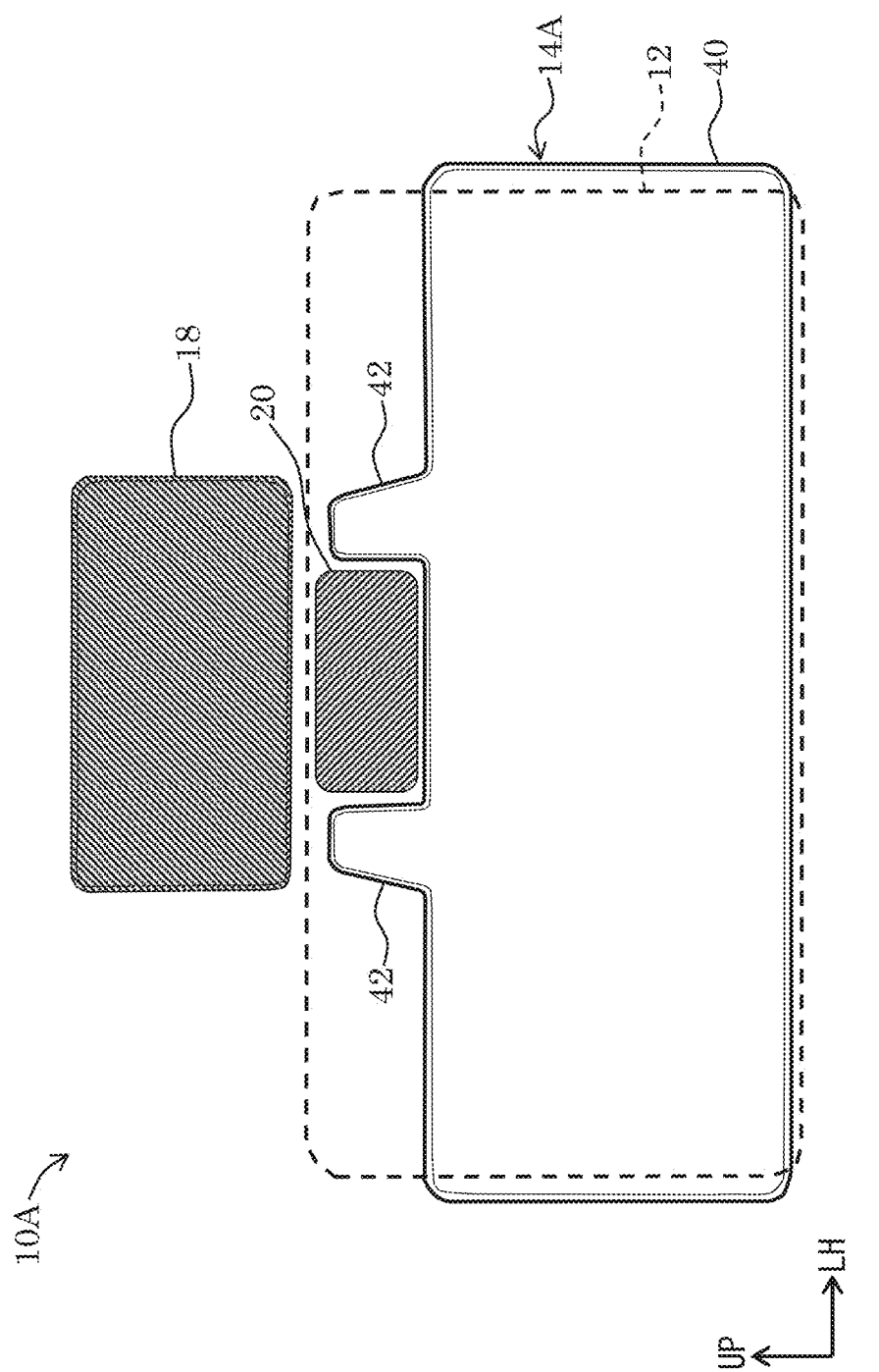
FIG. 4 is a schematic front view of a front portion of a vehicle on which a license plate is to be mounted, according to another embodiment of the present disclosure.

The vehicle front structure 10 according to the above described embodiment is configured with the washer 20 disposed below the body 40 of the bracket 14 in order to clean the sensing surface 18 of the LiDAR disposed below the license plate 12. However, as shown in FIG. 4, the vehicle front structure 10 may be configured with the washer 20 disposed above the body of the bracket 14 in order to clean the sensing surface 18 of the LiDAR disposed above the license plate 12. It should be noted that, in FIG. 4 and FIG. 5 described below, the front grille, and the detail structures of the brackets 14A, 14B are omitted. In a vehicle front structure 10A shown in FIG. 4, the supporting portions 42 of the bracket 14A protrude upward on respective sides of the washer 20 to sandwich the washer 20. The washer 20 moves forward on the back side of the license plate 12 and cleans the sensing surface 18 of the LiDAR by jetting the cleaning liquid upward. The vehicle front structure 10A has the same effects as the vehicle front structure 10 described above.

Figure 5:
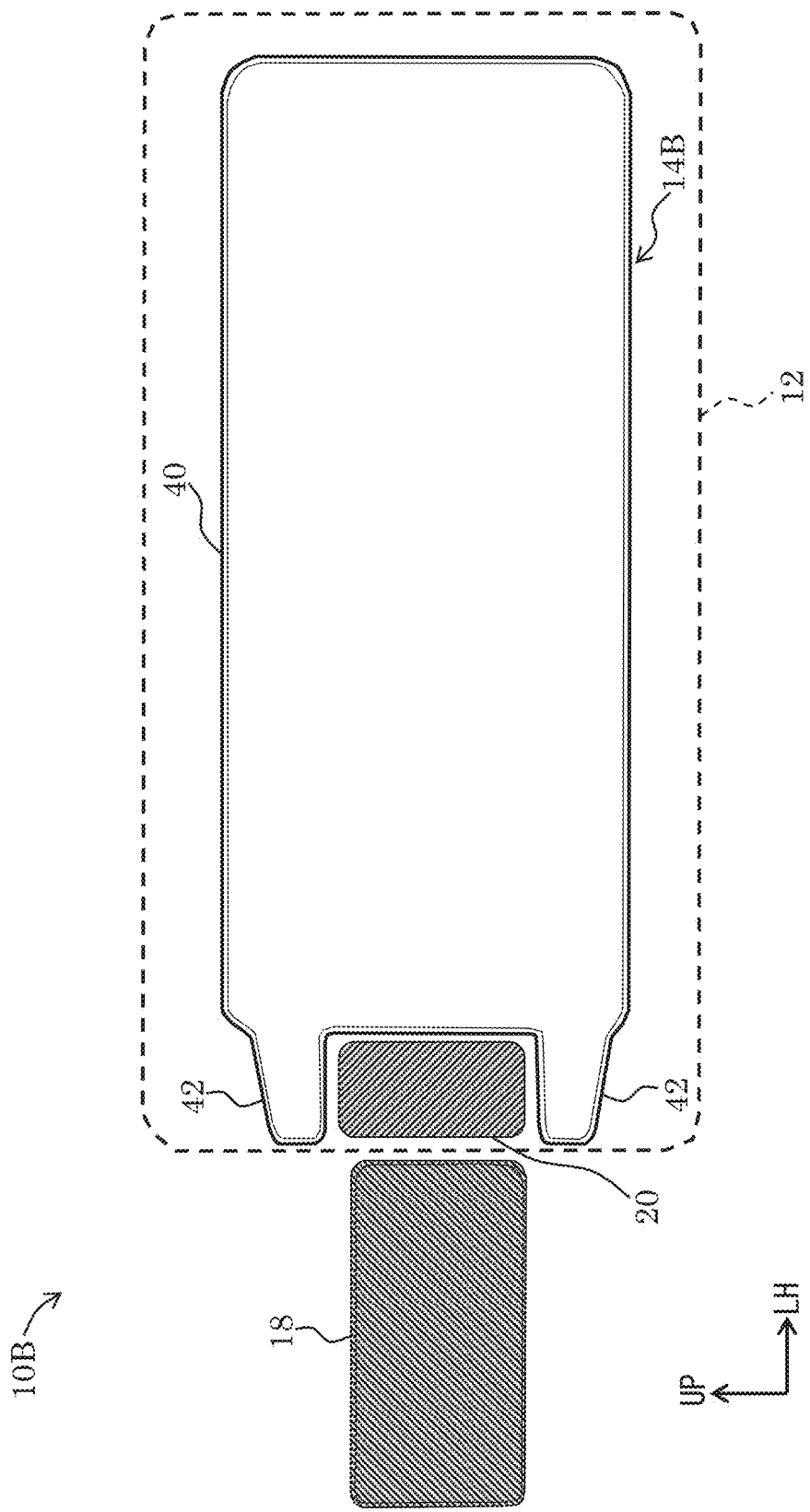
FIG. 5 is a schematic front view of a front portion of a vehicle on which a license plate is to be mounted, according to yet another embodiment of the present disclosure.

As shown in FIG. 5, a vehicle front structure 10B may be configured with the washer 20 disposed on the vehicle right of the body 40 of a bracket 14B in order to clean the sensing surface 18 of the LiDAR disposed on the vehicle right of the license plate 12. In the vehicle front structure 10B shown in FIG. 5, the supporting portions 42 of the bracket 14B on respective sides (above and below) of the washer 20 protrude vehicle rightward to thereby sandwich the washer 20. The washer 20 moves forward on the back side of the license plate 12 and cleans the sensing surface 18 of the LiDAR by jetting the cleaning liquid vehicle rightward. The vehicle front structure 10B has the same effects as the vehicle front structure 10 described above.

The vehicle front structure 10B in FIG. 5 may have a vertically symmetric configuration. Specifically, the vehicle front structure 10B may be configured with the washer 20 disposed on the vehicle left of the body 40 of the bracket 14B in order to clean the sensing surface 18 of the LiDAR disposed on the vehicle left of the license plate 12. In this configuration, the supporting portions 42 of the bracket 14B protrude vehicle leftward on the respective sides (above and below) of the washer 20 to thereby sandwich the washer 20. The washer 20 moves forward on the back side of the license plate 12 and cleans the sensing surface 18 of the LiDAR by jetting the cleaning liquid vehicle leftward. The vehicle front structure 10B having this configuration has the same effects as the vehicle front structure 10 described above.

The vehicle front structures according to the above described embodiments of the present disclosure include a LiDAR which is one type of sensor to monitor the front of the vehicle. However, the vehicle front structure may include a sensor of another type to monitor the front of the vehicle and clean the sensing surface of the sensor with the washer 20. Other vehicle front monitoring sensors include, for example, laser sensors, infrared sensors, and cameras, but are not limited to these examples. The sensing surface indicates either one or both of the surface which emits signals for sensing such as electromagnetic waves (including light) and the surface which receives signals such as electromagnetic waves (including light). When the sensor emits or receives the signals through a translucent cover or another element, a surface of the cover or the other element is also a sensing surface. When the sensor is a camera, a lens surface or a surface of a translucent cover over the front of the lens is also a sensing surface.

The washer 20 according to the above described embodiments is configured to clean the sensing surface of a sensor by jetting cleaning liquid. However, the washer 20 may be configured to clean the sensing surface by jetting air in place of or in addition to the cleaning liquid.

The supporting portions 42 of the bracket according to the above described embodiments are disposed on respective sides (right and left, or above and below) of the washer 20 to thereby sandwich the washer 20. However, the supporting portions 42 of the bracket may be disposed on one side (right or left, or above or below) of the washer 20. Further, the supporting portions 42 of the bracket may be provided separately from the body 40 of the bracket and fastened to the body 40. No particular limitations are imposed on the number, width, length, shape, and material of the supporting portions 42.

The invention claimed is:

1. A vehicle front structure comprising:
   a bracket disposed between a part of a back surface of a license plate and a front grille, the bracket fastening the license plate to the front grille; and
   a washer having a nozzle, the washer configured to move forward, in a vehicle longitudinal direction, towards a back side of the license plate in an area without the bracket in order to clean a sensing surface of a sensor which monitors the front of a vehicle, wherein
   the washer is positioned rearward of the back surface of the license plate in a non-cleaning position and a cleaning position, and
   the bracket comprises one or a plurality of supporting portions protruding on the washer side and supporting the license plate from the back side thereof.

2. The vehicle front structure according to claim 1, wherein
   the plurality of supporting portions of the bracket are disposed on respective sides of the washer to thereby sandwich the washer.

3. The vehicle front structure according to claim 1, wherein
   the sensor is a LiDAR configured to sense an object in front of the vehicle.

4. The vehicle front structure according to claim 1, wherein
   the washer is disposed below a body of the bracket in order to clean the sensing surface disposed below the license plate.

5. The vehicle front structure according to claim 1, wherein
   the washer is disposed above a body of the bracket in order to clean the sensing surface disposed above the license plate.

6. The vehicle front structure according to claim 1, wherein the washer is disposed on the vehicle right of a body of the bracket in order to clean the sensing surface disposed on the vehicle right of the license plate.

7. The vehicle front structure according to claim 1, wherein the washer is disposed on the vehicle left of a body of the bracket in order to clean the sensing surface disposed on the vehicle left of the license plate.

8. A vehicle front structure comprising:

a bracket disposed between a part of a back surface of a license plate and a front grille, the bracket fastening the license plate to the front grille; and a washer configured to move forward, in a vehicle longitudinal direction, towards a back side of the license plate in an area without the bracket in order to clean a sensing surface of a sensor which monitors the front of a vehicle, from a non-cleaning position to a cleaning position, wherein the washer is positioned rearward of the back surface of the license plate in the non-cleaning position and the cleaning position, and the bracket comprises one or a plurality of supporting portions protruding on the washer side and supporting the license plate from the back side thereof.

9. The vehicle front structure according to claim 8, wherein the plurality of supporting portions of the bracket are disposed on respective sides of the washer to thereby sandwich the washer.

10. The vehicle front structure according to claim 8, wherein the sensor is a LiDAR configured to sense an object in front of the vehicle.

11. The vehicle front structure according to claim 8, wherein the washer is disposed below a body of the bracket in order to clean the sensing surface disposed below the license plate.

12. The vehicle front structure according to claim 8, wherein the washer is disposed above a body of the bracket in order to clean the sensing surface disposed above the license plate.

13. The vehicle front structure according to claim 8, wherein the washer is disposed on the vehicle right of a body of the bracket in order to clean the sensing surface disposed on the vehicle right of the license plate.

14. The vehicle front structure according to claim 8, wherein the washer is disposed on the vehicle left of a body of the bracket in order to clean the sensing surface disposed on the vehicle left of the license plate.

\* \* \* \* \*